United States Patent
Lilie et al.

(10) Patent No.: US 6,842,968 B2
(45) Date of Patent: Jan. 18, 2005

(54) DEVICE AND PROCESS FOR MOUNTING A ROTOR OF A HERMETIC COMPRESSOR

(75) Inventors: Dietmar Erich Bernhard Lilie, Joinville (BR); Marcos Fernando Odorczyk, Joinville (BR)

(73) Assignee: Empresa Brasileira de Compressores S.A.-Embraco, Joinville (BR)

( * ) Notice: Subject to any disclaimer, the term of this patent is extended or adjusted under 35 U.S.C. 154(b) by 31 days.

(21) Appl. No.: 10/168,675

(22) PCT Filed: Dec. 18, 2000

(86) PCT No.: PCT/BR00/00141
§ 371 (c)(1),
(2), (4) Date: Nov. 21, 2002

(87) PCT Pub. No.: WO01/46588
PCT Pub. Date: Jun. 28, 2001

(65) Prior Publication Data
US 2003/0184174 A1 Oct. 2, 2003

(30) Foreign Application Priority Data
Dec. 21, 1999 (BR) .............................................. 9906254

(51) Int. Cl.⁷ .......................... H02K 15/02; H02K 15/10
(52) U.S. Cl. .............................. 29/598; 29/447; 29/596; 29/732; 29/888.021; 29/888.022; 310/90; 310/91; 310/261
(58) Field of Search .......................... 29/598, 447, 596, 29/732, 888.021, 888.022; 310/90, 91, 261

(56) References Cited

U.S. PATENT DOCUMENTS 5,974,656 A * 11/1999 Fernandez .................... 29/596
6,376,954 B1 * 4/2002 Nunes, Jr. ..................... 310/91

FOREIGN PATENT DOCUMENTS

| JP | 57 181980 | 11/1982 | .......... F04B/35/00 |
| JP | 04-140487 | * 5/1992 | .......... F04B/29/00 |
| WO | 99/39425 | 8/1999 | .......... H02K/15/16 |

* cited by examiner

Primary Examiner—Carl J. Arbes
Assistant Examiner—Tim Phan
(74) Attorney, Agent, or Firm—Darby & Darby

(57) ABSTRACT

A device and a process for mounting the rotor of a hermetic compressor, said device comprising a pulling rod (40), which is loosely and coaxially provided through the rotor (30) of the electric motor of the compressor, in order to have a first end coupled to an end of the crankshaft (10) located adjacent to an end face of the rotor (30), and a second opposite end to be seated against an opposite end face of the rotor (30) and to which a driving means (DM) is engaged to move the pulling rod (40), in order to provoke a relative axial displacement of the crankshaft (10), sufficient to fit, by mechanical interference, the extension (11) of the crankshaft (10) inside the rotor (30).

16 Claims, 5 Drawing Sheets

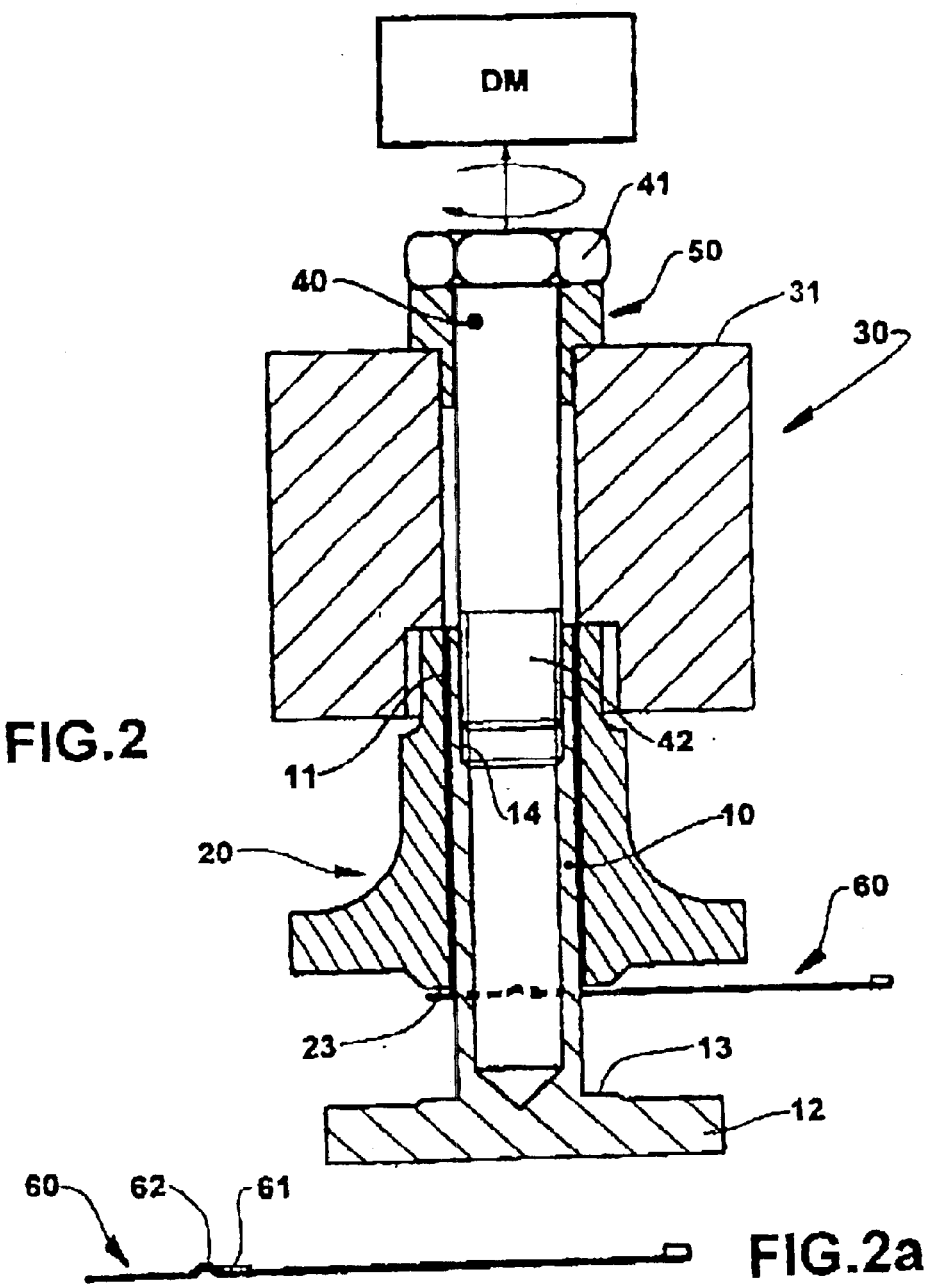
FIG.2
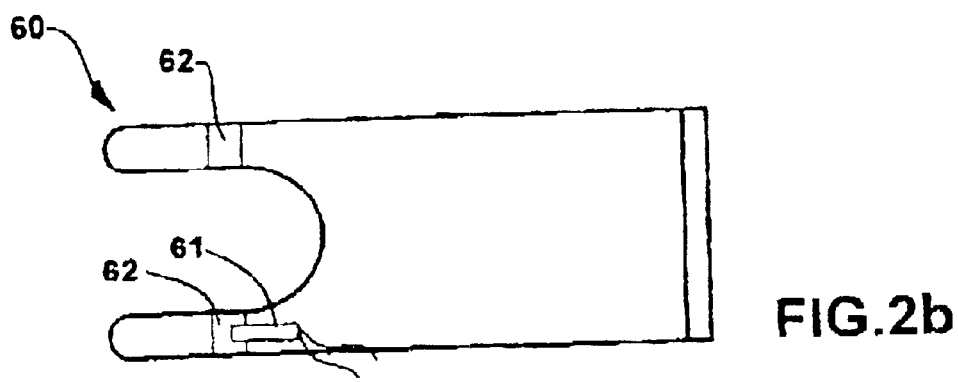
FIG.2a
FIG.2b

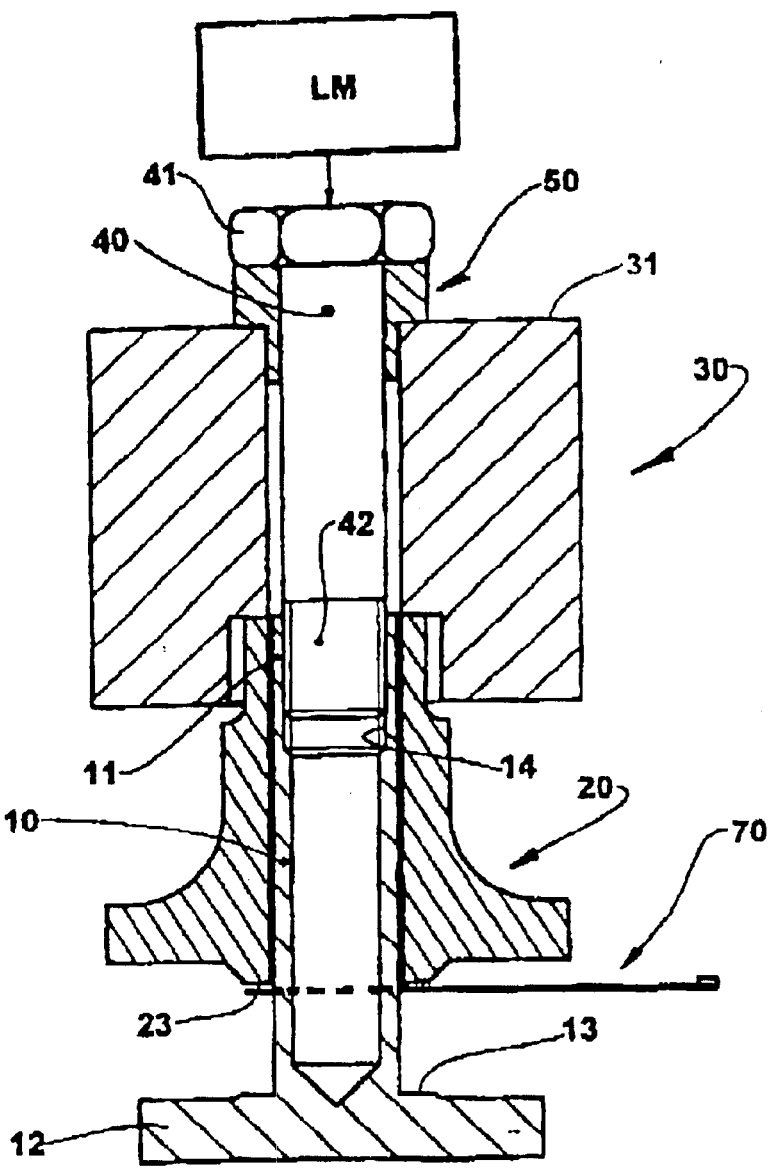
FIG.4
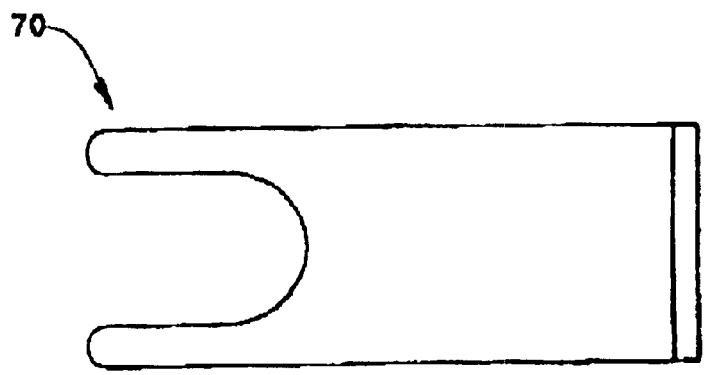
FIG.4a
FIG.4b

US 6,842,968 B2

DEVICE AND PROCESS FOR MOUNTING A ROTOR OF A HERMETIC COMPRESSOR

CROSS REFERENCE TO RELATED DOCUMENTS

This application is a 371 of PCT/BR00/00141, filed on Dec. 18, 2000, which claims the benefit of Brazilian Patent Application No. PI-99066254, filed Dec. 21, 1999, both of which are incorporated herein by reference.

FIELD OF THE INVENTION

The present invention refers to a device and a process for providing the mounting and fixation of the rotor of an electric motor to the crankshaft of a hermetic compressor of the type normally used in small refrigeration systems.

BACKGROUND OF THE INVENTION

One of the known constructions to obtain the fixation of the rotor of an electric motor to the crankshaft of the compressor uses mounting by mechanical interference. In this prior art arrangement, the rotor is heated to a certain temperature, which is insufficient to damage its structure, but which promotes a thermal dilatation that is necessary to allow the introduction of the crankshaft inside the rotor, without requiring mechanical efforts that may impair the structure of the rotor. After introducing the crankshaft into the rotor, the latter, already under a cooling process, exerts pressure around the crankshaft by thermal contraction, guaranteeing the rotational and axial locking between the rotor and the crankshaft.

In this type of rotor-crankshaft assembly, the heating of the rotor is effected at a temperature that is high enough to promote thermal dilatation, which will minimize the axial efforts to be imparted to the rotor during its mounting to the crankshaft, being also considered that the difference between the nominal diameters of the crankshaft and of the rotor should have such a value as to guarantee the necessary interference upon completion of the mounting operation.

In the most widely used rotors, such as for example those in which the magnets are mounted between a rotor core and a steel cover, the structure of the rotor is strong enough to support heating and the axial efforts which are necessary to promote the fitting of the crankshaft into the rotor. These rotors of a well known construction, for instance with a steel cover surrounding the magnets, have a structure that is strong enough to allow a simple and cost effective mounting of the rotor to the crankshaft, by mechanical interference with previous heating.

However, in other rotors, such as for example, those in which the magnets are affixed to the rotor core only by gluing, dispensing the use of the external steel cover, the resulting structure, although being simpler, less expensive, and electromagnetically more efficient, is not strong enough to withstand, with no risks of damages, the efforts and the temperature to which it is submitted if mounted by interference with previous heating. The heating to be applied to the rotor, so that it may be mounted around the crankshaft, jeopardizes the gluing of the magnets around the rotor core or other structural characteristics, impairing the reliability of the compressor to be produced.

The mounting solutions by interference without heating, although being acceptable in certain situations in which the rotors are structurally more resistant, are achieved by applying, to the rotor and to the external end of the crankshaft, opposite axial forces which, during the mounting operation, are easily misaligned by positioning deviations of the retaining means and the driving means which are applied to both the crankshaft and the rotor. This possibility of misalignment is mainly due to the fact that the axial force applied to the crankshaft is compressive, acting against the end of the crankshaft opposite to the rotor. The mounting misalignments, even being small, tend to provoke unacceptable deformations in the assembly to be formed.

The mounting solutions, which have been proposed to such rotors of fragile construction, require complex procedures that will increase the cost of the final product, as it occurs, for example, when the fixation of the rotor to the crankshaft is made by gluing.

DISCLOSURE OF THE INVENTION

It is a general object of the present invention to provide a mounting device, which has a simple and strong construction, in order to guarantee the fixation, by mechanical interference, of a rotor of an electric motor to the crankshaft of a hermetic compressor, without requiring preheating operations of the rotor and minimizing the risks of occurring misalignments between the parts during the mounting operation.

The objective above is achieved by providing a hermetic compressor comprising: a crankshaft having an end flange provided with an annular surface and an extension; a bearing hub, radially journalling the crankshaft and having an end annular face defining an axial bearing with the annular surface; and a rotor of an electric motor to be affixed, by mechanical interference, around the extension of the crankshaft. According to the invention, the mounting device comprises: a pulling rod, which is loosely and coaxially provided through the rotor, in order to have a first end coaxially and releasably coupled to an end of the crankshaft, to be fitted inside the rotor, and a second opposite end, to be seated against an opposite end face of the rotor; a driving means, engaged to the second end of the pulling rod, so as to move the latter to provoke an axial displacement of the crankshaft, sufficient to fit, by mechanical interference, its extension inside the rotor; an axial gap defining means, which is displaced between an inoperative position and an operative position, in which it is positioned between the annular surface of the end flange of the crankshaft and the end annular face of the bearing hub, in order to interrupt the axial mounting displacement of the crankshaft in the rotor, when the axial gap between the annular surface and the end annular face reaches a determined value; and an extracting means, which is operatively coupled to the gap defining means, so as to displace the latter between its inoperative and operative positions.

It is a further object of the present invention to provide a mounting process by mechanical interference, which is easily and safely achieved, in order to guarantee the fixation, by mechanical interference, of the rotor of an electric motor to the crankshaft of a hermetic compressor, without requiring preheating or unnecessary efforts over the structure of the rotor and minimizing the risks of occurring misalignments between the parts during the mounting operation.

BRIEF DESCRIPTION OF THE DRAWINGS

The invention will be described below, with reference to the attached drawings, in which:

FIG. 2 is a view similar to that of FIG. 1, but illustrating the crankshaft in an initial introduction condition into the rotor and using a first embodiment for the axial gap defining means, which defines the gap between the crankshaft and the bearing hub;

FIG. 2a is an enlarged lateral view of the axial gap defining means used in FIG. 2;

FIG. 2b is a plan view of the axial gap defining means of FIG. 2;

FIGS. 4, 4a and 4b are views respectively similar to FIGS. 2, 2a and 2b, but using another embodiment of the axial gap defining means;

BEST MODE OF CARRYING OUT THE INVENTION

Figure 1:
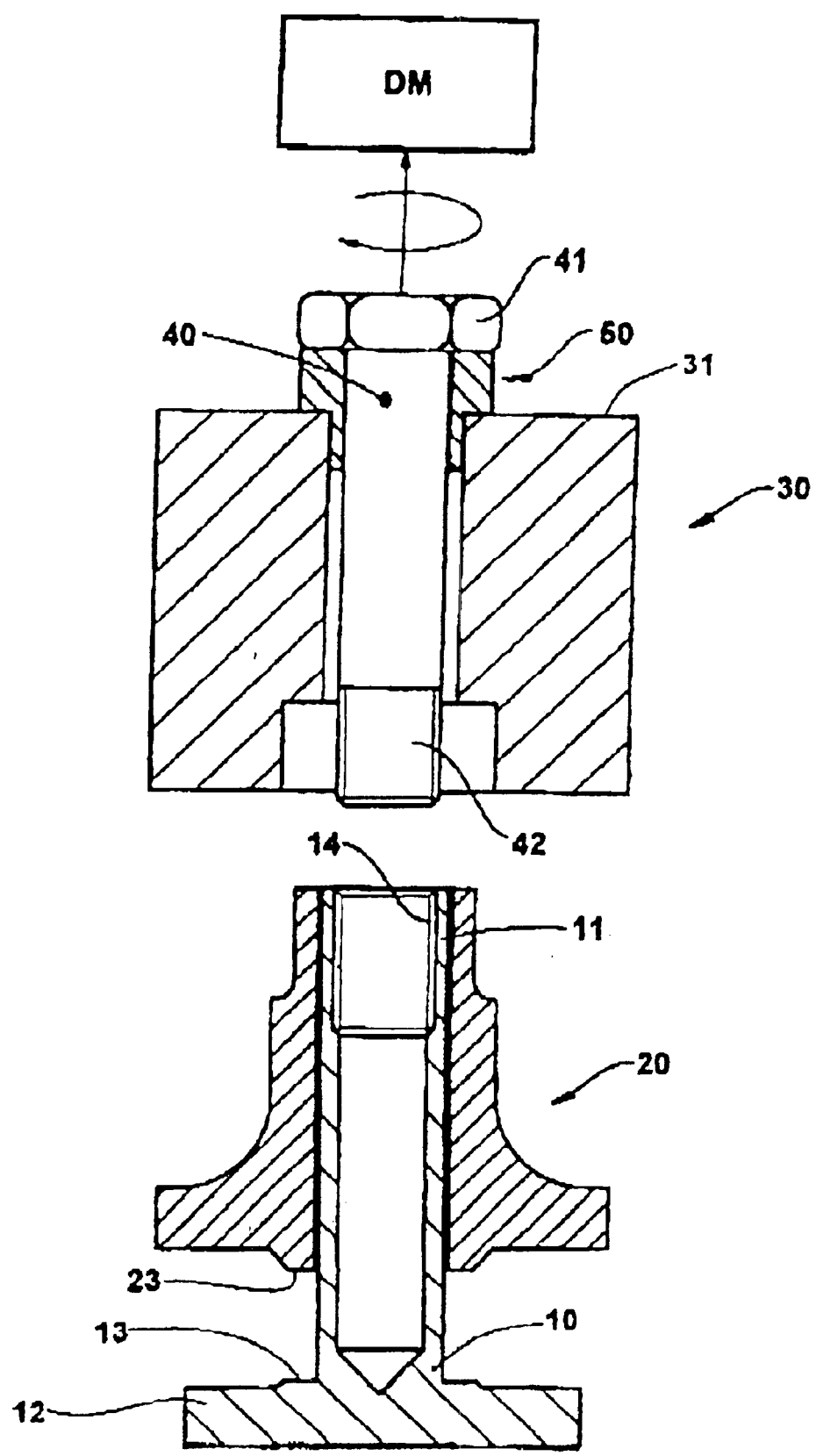
FIG. 1 is a diametral longitudinal sectional view of an assembly comprising the rotor, the crankshaft, the bearing hub and the mounting device, in a mounting phase preceding the introduction of the crankshaft into the rotor.

As illustrated in the drawings, the present mounting device and process are applied to a hermetic compressor, whose crankshaft 10, which is journalled through a bearing hub 20, has an extension 11, around which is affixed a rotor 30 of the electric motor of the compressor, and which incorporates an end flange 12 defining an annular surface 13 to be axially seated against a respective end annular face 23 of the bearing hub 20.

According to the illustrated embodiment, the mounting device of the present invention comprises a pulling rod 40, usually in the form of a screw having a diameter that is substantially smaller than the internal diameter of the rotor and having a length, which is larger than the axial extension of the rotor 30. The pulling rod 40 incorporates, at an end thereof, an enlarged head 41, which is preferably configured to receive a driving means, generally a tool for applying a rotary movement (not illustrated), said enlarged head 41 being dimensioned to be seated against an end face 31 of the rotor 30 when the pulling rod 40 is introduced through said rotor 30.

The end of the pulling rod 40, opposite to the enlarged head 41, has a threaded portion 42, which in the illustrated embodiment is provided external to the pulling rod 40.

Also according to the illustrated embodiment, there is provided a bearing 50, usually a rolling bearing, which is mounted around the pulling rod 40, between the enlarged head of the latter and the adjacent end face 31 of the rotor 30, allowing the enlarged head 41 to rotate freely with minimum attrition in relation to the end face 31 of the rotor 30 against which it is seated.

With the pulling rod 40 being mounted through the rotor 30, the end thereof, provided with the threaded portion 42, is coaxially coupled to a thread extension 14 provided inside the extension 11 of the crankshaft 10 and having a tubular shape at least in part of its length, and an external diameter dimensioned to allow the fitting by interference inside the rotor 30.

The coaxial coupling of the threaded portion 42 of the pulling rod 40 to the thread extension 14 of the crankshaft 10 is usually obtained after the latter has been mounted through the bearing hub 20, until the end annular face 23 of said hub defines an axial bearing with an adjacent annular surface 13 of an end flange 12 of the crankshaft 10.

With the enlarged head 41 of the pulling rod 40 being seated against the adjacent end face 31 of the rotor 30 and with the threaded portion 42 coupled to the thread extension 14 of the crankshaft 10, a rotation is imparted to the enlarged head 41, in order to cause the axial displacement of the crankshaft 10 to the inside of the rotor 30, until the extension 11 of the crankshaft 10 has been completely fitted, by mechanical interference, inside the rotor 30, guaranteeing a safe and correct fixation of the latter to the crankshaft 10.

According to the procedure described above, the axial efforts applied to the rotor 30 during its fitting by interference around the crankshaft 10 are concentrated in the core of the rotor 30, avoiding damages to the structure of said rotor.

In the embodiment illustrated for the present mounting device, the pulling rod 40, incorporating the enlarged head 41, is loosely introduced through the bearing 50 and the rotor 30, before being coupled to the crankshaft 10 already mounted through the bearing hub 20. However, it should be understood that the enlarged head 41 may have an independent construction, to be coupled to the pulling rod 40 by means of a thread or any other means, provided that, when rotated to one direction, it causes the axial displacement of the crankshaft 10 to the inside of the rotor 30.

Though not illustrated herein, it should be understood that the movement of the pulling rod 40 may be achieved by an axial displacement sufficient to promote the fitting of the crankshaft 10 inside the rotor 30.

In these constructive variants, in which the pulling rod 40 is submitted to an axial displacement by a driving means DM of any type, which is only schematically illustrated and supported on the adjacent end face of the rotor 30, the coupling of the pulling rod 40 to the crankshaft 10 may be achieved, for example, with any of the two solutions below:

In the first solution, the coupling is obtained by the thread extension 14 of the crankshaft 10 and by the threaded portion 42 of the pulling rod 40, which are mutually engaged. After this coupling, in which the crankshaft 10 remains fixed, the driving means is actuated to axially displace the rod-crankshaft assembly. In this solution, the mounting of the crankshaft 10 is obtained by axially moving the pulling rod 40 only.

In the second solution, the first end of the pulling rod 40 may be provided with a lowered portion, which will be fitted, after small axial and rotational displacements of the pulling rod 40 towards the crankshaft 10 and coaxially to the latter, into a respective projection provided inside the adjacent end of the crankshaft 10.

Upon completion of the coupling, the driving means DM is activated to promote the axial displacement of the rod-crankshaft assembly to obtain the desired mounting.

In all solutions considered herein, after the mounting of the crankshaft 10 to the rotor 30 has finished, the pulling rod 40 is uncoupled from the assembly and withdrawn from the inside of the rotor.

In any of the mounting solutions mentioned above, it is necessary to provide a reduced axial gap between the annular surface 13 of the end flange 12 of the crankshaft 10 and the end annular face 23 of the bearing hub 20, so that these two confronting portions define an axial bearing for the crankshaft-bearing hub assembly.

Said axial gap may be obtained by any other adequate means which guarantees the desired spacing between the surfaces of the axial bearing to be formed.

Figures 3, 3A:
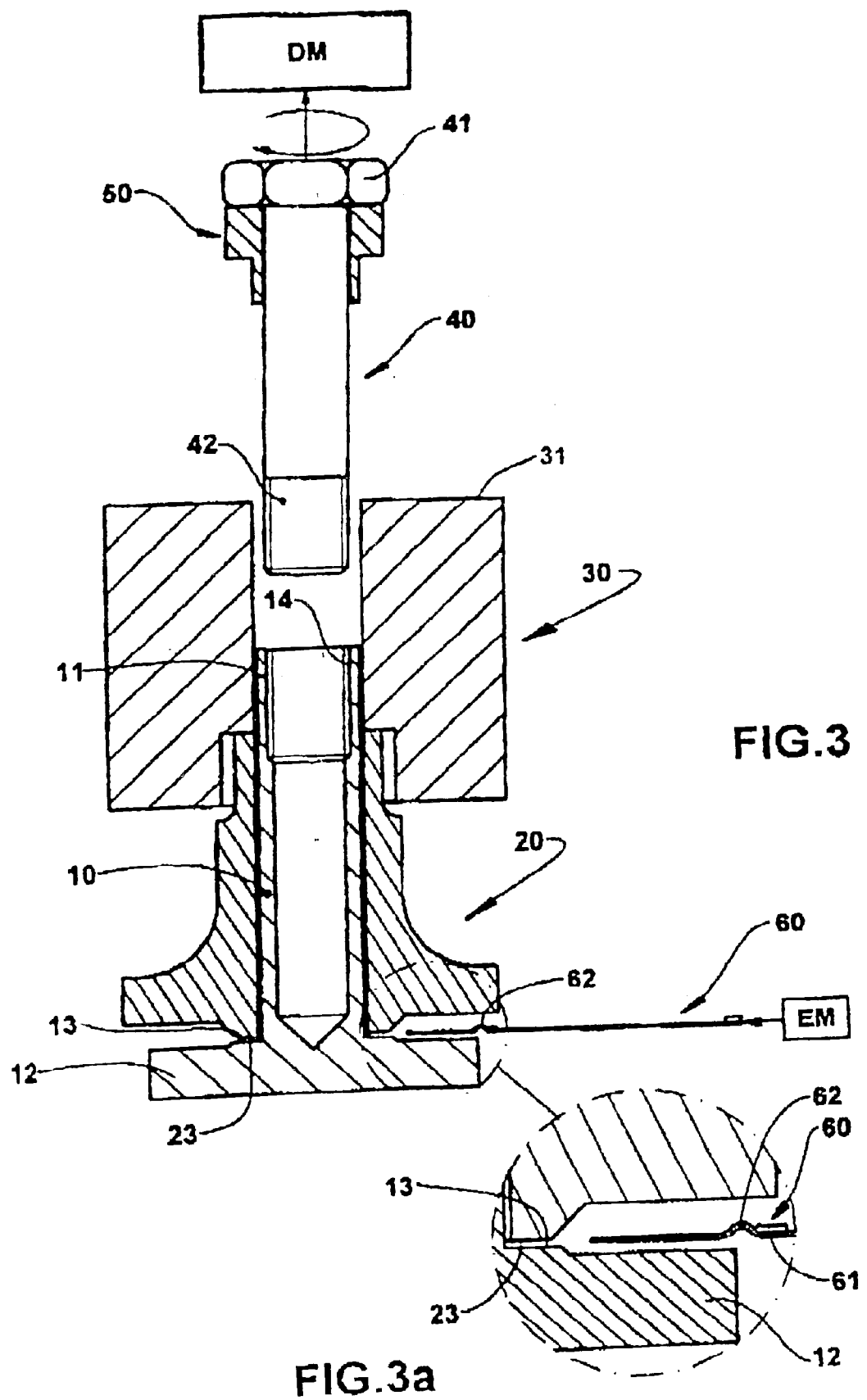
FIG. 3 is a similar view to that of FIG. 2, but illustrating the crankshaft already fitted and affixed inside the rotor, and the pulling rod and the axial gap defining means being disengaged from the crankshaft.
FIG. 3a is an enlarged detail of part of FIG. 3, illustrating the axial gap of the bearing and the relative positioning of the axial gap defining means when being disengaged.

A possible solution for this issue is illustrated in FIGS. 2, 2a, 2b, 3 and 3a.

In this, embodiment, a measuring blade 60, provided with a gap sensing means 61, is positioned between the annular surface 13 of the crankshaft 10 and the end annular face 23 of the bearing hub 20, so that the gap sensing means 61 may detect the axial distance between the two axial bearing confronting portions and interrupt the mounting axial displacement of the crankshaft 10 inside the rotor 30 exactly when the desired axial distance between said axial bearing confronting portions has been reached.

The measuring blade 60 may be constructed from a sheet about 0.1–0.2 mm thick with a U shaped contour, in order to be loosely fitted around the crankshaft 10, and provided with a bulge 62 for each of its lateral legs, which are positioned and dimensioned to suffer a certain elastic deformation when pressed between the crankshaft 10 and the bearing hub 20 at the end of the mounting displacement of said crankshaft 10 in the rotor 30. The elastic deformation of the bulge 62 of the measuring blade 60 is detected by the gap sensing means 61, which may take the form of a "strain gage" (or deformation sensor) incorporated to said measuring blade 60 at the region of the bulge 62.

When a certain deformation of the bulge 62 has been reached, the gap sensing means 61 signalizes to a control unit (not illustrated) the instruction for stopping the driving means acting upon the pulling rod 40. Thus, a correct axial gap is obtained between the crankshaft 10 and the bearing hub 20, without occurring retention of the measuring blade 60, which may be radially displaced out from the crankshaft-bearing hub assembly by action of an adequate extracting means EM, which is only schematically illustrated and which is operatively coupled to said measuring blade 60.

Figures 5, 5A:
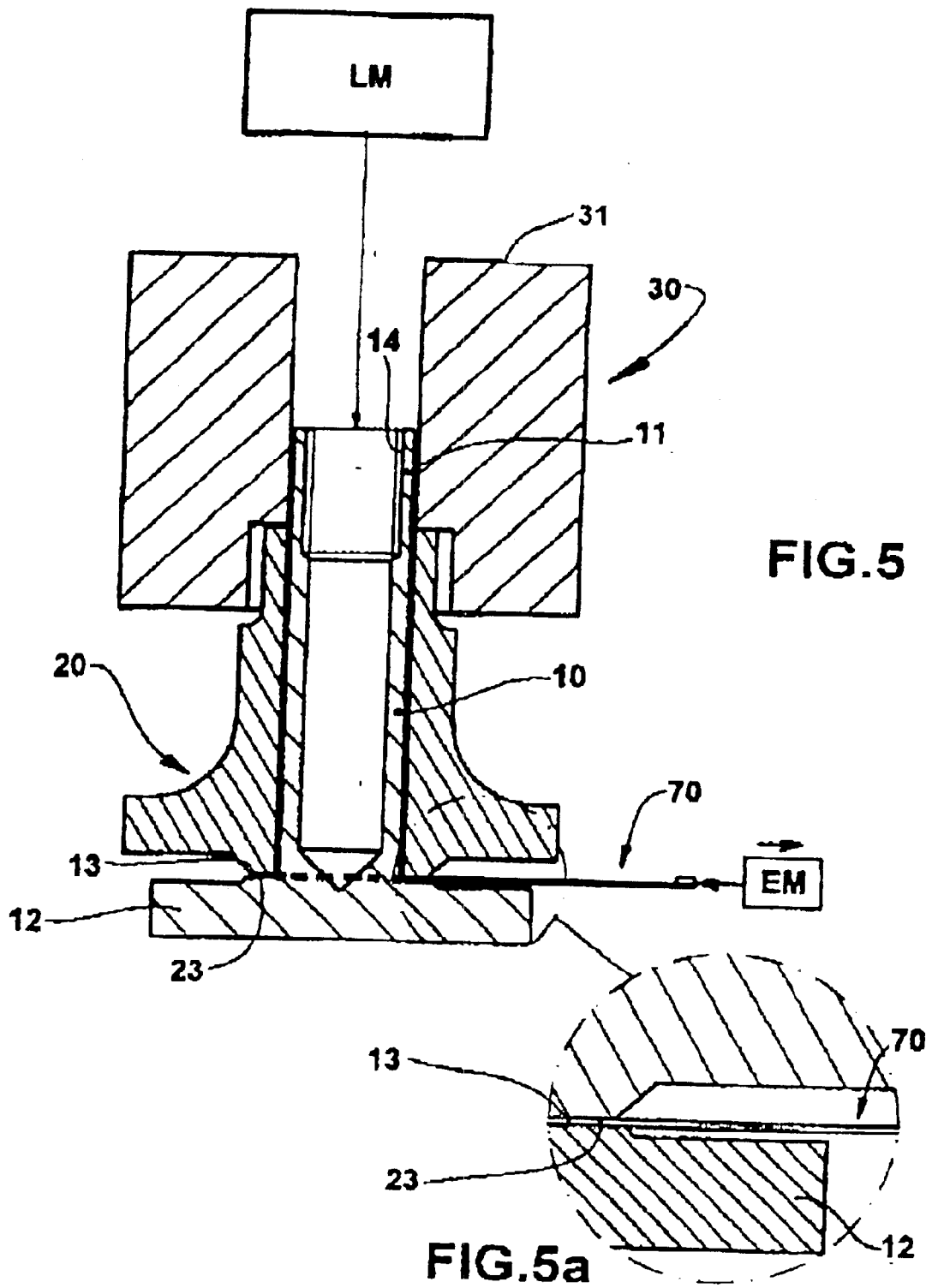
FIG. 5 is a view similar to that of FIG. 3, but illustrating the axial gap defining means still retained around the crankshaft, after removal of the pulling rod.
FIG. 5a is an enlarged detail of part of FIG. 5.

As illustrated in FIGS. 4, 4a, 4b, 5 and 5a, another solution for the formation of the gap required for obtaining the axial bearing comprises the provision of a gap blade 70, which has also a U contour and a thickness corresponding to the minimum axial gap to be obtained between the crankshaft 10 and the bearing hub 20.

As it occurs with the measuring blade 60, the gap blade 70 is radially displaced in opposite directions, on a plane orthogonal to the axis of the crankshaft 10, by actuation of an adequate extracting means EM.

The positioning of the gap blade 70 around the crankshaft 10 at the moment of its assembly makes said gap blade be pressed between the annular surface 13 of the crankshaft 10 and the end annular face 23 of the bearing hub 20, limiting the penetration of the crankshaft 10 into the rotor 30, by an automatic control of the pulling force. In this solution, the gap blade 70 is retained sandwiched between the annular surface 13 of the end flange 12 of the crankshaft 10 and the end annular face 23 of the bearing hub 20.

In this case, in order to extract the gap blade 70, there is applied, by a liberating means LM, to the end of the crankshaft 10 inserted into the rotor 30, an axial impact in the opposite direction to the mounting direction, and with an effort proportionate to the pulling force used for mounting the crankshaft 10 to the rotor 30. This axial impact provokes a small relative axial displacement between the crankshaft 10 and the rotor 30 within desired limits and sufficient to allow the gap blade 70 to be displaced outwardly from the crankshaft 10, leaving an axial gap between the annular surface 13 of the end flange 12 of the crankshaft 10 and the end annular face 23 of the bearing hub 20.

The constructive solution proposed herein allows the crankshaft 10 to be drawn to the inside of the rotor 30 by applying an axial force to the end of the crankshaft 10 to be inserted into the rotor 30 and through means supported on the rotor itself, minimizing the risks of misalignments between the axis according to which the axial force is applied and the crankshaft 10.

What is claimed is:

1. A device for mounting a rotor of a hermetic compressor of the type comprising: a crankshaft having an end flange provided with an annular surface and an extension; a bearing hub, radially journalling the crankshaft and having an end annular face defining an axial bearing with the annular surface; and a rotor of an electric motor to be affixed, by mechanical interference, around the extension of the crankshaft comprising:

a pulling rod, which is loosely and coaxially provided through the rotor, in order to have a first end coaxially and releasable coupled to an end of the crankshaft, which is fitted inside the rotor, and a second opposite end, to be seated against an opposite end face of the rotor; a driving means, engaged to the second end of the pulling rod so as to move the latter to cause an axial displacement of the crankshaft, sufficient to fit, by mechanical interference, its extension inside the rotor;

an axial gap defining means which is displaced between an inoperative position and an operative position, in which it is positioned between the annular surface of the end flange of the crankshaft and the end annular face of the bearing hub, in order to interrupt the axial mounting displacement of the crankshaft in the rotor, when the axial gap between the annular surface and the end annular face reaches a determined value; and an extracting means (EM), which is operatively coupled to the axial gap defining means so as to displace the latter between its inoperative and operative positions.

2. The device, as in claim 1, wherein the axial gap defining means is in the form of a measuring blade provided with a bulge, which is operatively associated with a gap sensing means and which is elastically deformable, in the operative position of the axial gap defining means, when pressed between the end annular face of the bearing hub and the annular surface of the end flange of the crankshaft.

3. The device, as in claim 2, wherein the gap sensing means is defined by a strain gage incorporated to the measuring blade in the region of its bulge.

4. The device as in claim 1, wherein the axial gap defining means is in the form of a gap blade, whose thickness corresponds to the minimum axial gap to be obtained between the annular surface and the end annular face of the bearing hub, and which is positioned, in the operative position of the axial gap defining means, between the annular surface and the end annular face.

5. The device, as in claim 4, further comprising a liberating means which is arranged so as to apply against the crankshaft, already mounted to the rotor, an axial impact in a direction opposite to the mounting direction and with an effort proportionate to the pulling force used for mounting the crankshaft to the rotor and sufficient to liberate the displacement of the gap blade to the inoperative position.

6. The device, as in claim 1, wherein the second opposite end of the pulling rod receives an enlarged head, to be seated against the adjacent end face of the rotor, wherein at least one of the mountings between the pulling rod and the crankshaft and between the pulling rod and the enlarged heads is achieved through threads in mutual engagement, so that the rotation of the enlarged head in one direction in relation to the rotor and to the crankshaft causes said axial displacement of the crankshaft in order to fit the latter into the rotor.

7. The device, as in claim 6, further comprising a bearing provided around the pulling rod between the enlarged head and said opposite end face of the rotor.

8. The device as in claim 7, wherein the bearing is a rolling bearing.

9. The device, as in claim 6, wherein the enlarged head is incorporated in a single piece to the pulling rod, whose end is provided with a threaded portion to be engaged to a thread extension provided in the end of the crankshaft.

10. The device, as in claim 9, wherein the thread extension is internally provided in a tubular annular portion of the crankshaft.

11. A process for mounting a rotor of a hermetic compressor, of the type comprising: a crankshaft having an end flange provided with an annular surface and an extension; a bearing hub, radially journalling the crankshaft and having an end annular face defining an axial bearing with the annular surface; and a rotor of an electric motor to be affixed, by mechanical interference, around the extension of the crankshaft comprising the steps of:

a—providing a pulling rod having an end, which is coaxially and releasably coupled to a first end of the crankshaft and a second opposite end, to be seated against the opposite end face of the rotor;

b—providing the coaxial mounting, in any order: of the crankshaft through the bearing hub; of a pulling rod, loosely provided through the rotor; and of a first end of the pulling rod releasably coupled to an end of the crankshaft located adjacent to an end face of the rotor; and of an axial gap defining means between the annular surface and the end annular face; and c—seating the second opposite end of the pulling rod onto the opposite end face of the rotor and move it in relation to the rotor, in order to promote the relative axial displacement of the extension of the crankshaft to the inside of the rotor, until the axial gap defining means detects a determined axial gap between the annular surface and the end annular face.

12. The process, as in claim 11, wherein the second opposite end of the pulling rod is rotated in relation to the rotor and to the crankshaft, in order to promote the axial displacement of the crankshaft, in order to fit the latter into the rotor.

13. The process, as in claim 12, wherein the axial displacement of the crankshaft by the rotation of the pulling rod is achieved by the engagement of a thread portion, provided inside a tubular end portion of the crankshaft adjacent to the rotor, to an externally threaded portion of the pulling rod.

14. The process, as in claim 11, wherein the determined axial gap between the annular surface and the end annular face is determined by the degree of elastic deformation to which the axial gap defining means is submitted by said parts that define the axial bearing.

15. The process, as in claim 11, wherein the determined axial gap between the annular surface and the end annular face is determined by the thickness of the axial gap defining means positioned therebetween when in an operative position.

16. The process, as in claim 15, wherein the displacement of the axial gap defining means from an operative position, locked between the annular surface and the end annular face, is achieved simultaneously with the application of an axial impact to the crankshaft in a direction opposite to that in which the rotor is mounted.

* * * * *